United States Patent [19]
Chess et al.

[11] Patent Number: 6,054,170
[45] Date of Patent: Apr. 25, 2000

[54] IDENTIFICATION CARD AND METHOD OF MAKING

[75] Inventors: Stanley C. Chess, Goffstown, N.H.;
Myron C. Heeb, W. Seneca, N.Y.;
Scott A. Moeller, Grand Island, N.Y.;
Michael C. Maier, East Amherst, N.Y.;
Thomas P. Nash, Getzville, N.Y.

[73] Assignee: Moore U.S.A., Inc., Grand Island, N.Y.

[21] Appl. No.: 09/106,113

[22] Filed: Jun. 29, 1998

Related U.S. Application Data

[62] Division of application No. 08/942,589, Oct. 2, 1997, Pat. No. 5,895,074.

[51] Int. Cl.⁷ .................. B05P 3/00; B41M 3/14
[52] U.S. Cl. .................. 427/7; 427/288; 427/289; 427/554; 427/559; 427/395
[58] Field of Search .................. 427/7, 289, 288, 427/554, 559, 395

[56] References Cited

U.S. PATENT DOCUMENTS

| | | | |
|---|---|---|---|
| 2,616,612 | 11/1952 | Guttman . | |
| 2,708,068 | 5/1955 | Guttman | 229/92.8 |
| 3,093,296 | 6/1963 | Wood | 229/92.8 |
| 3,193,182 | 7/1965 | Yakovljevic | 229/92.8 |
| 3,273,785 | 9/1966 | Beckman et al. . | |
| 3,319,872 | 5/1967 | Beckman et al. . | |
| 3,346,172 | 10/1967 | Tucker | 229/92.8 |
| 4,097,297 | 6/1978 | Keene | 106/177 |
| 4,296,947 | 10/1981 | Spatz et al. | 282/27.5 |
| 4,352,706 | 10/1982 | Miller | 156/233 |
| 4,447,481 | 5/1984 | Holmberg et al. | 428/40 |
| 4,525,116 | 6/1985 | Holmberg | 412/8 |
| 4,536,013 | 8/1985 | Haghiri-Therani et al. | 283/77 |
| 4,560,426 | 12/1985 | Moraw et al. | 156/64 |
| 4,589,687 | 5/1986 | Hannon | 283/94 |
| 4,590,109 | 5/1986 | Holmberg | 428/40 |
| 4,608,295 | 8/1986 | Drum | 428/202 |
| 4,618,520 | 10/1986 | Holmberg | 428/131 |
| 4,645,736 | 2/1987 | Anthonsen et al. | 430/538 |
| 4,732,410 | 3/1988 | Holbein et al. | 283/67 |
| 4,747,620 | 5/1988 | Kay et al. | 283/86 |
| 4,748,452 | 5/1988 | Maurer | 346/1.1 |
| 4,773,677 | 9/1988 | Plasse | 283/77 |
| 4,780,974 | 11/1988 | Mitchell | 40/2 R |
| 4,846,501 | 7/1989 | Del Grande | 289/9 R |
| 4,846,502 | 7/1989 | Chang et al. | 283/57 |
| 4,888,896 | 12/1989 | Sanchez | 40/630 |
| 4,923,218 | 5/1990 | Vigilanti | 283/62 |
| 4,951,864 | 8/1990 | Dicker | 229/80 |
| 4,986,868 | 1/1991 | Schmidt | 156/249 |
| 5,100,179 | 3/1992 | Burden et al. | 283/62 |
| 5,131,686 | 7/1992 | Carlson | 283/75 |
| 5,403,236 | 4/1995 | Greig | 462/6 |
| 5,427,416 | 6/1995 | Birch | 283/109 |
| 5,518,787 | 5/1996 | Konkol | 428/43 |
| 5,529,345 | 6/1996 | Kohls | 283/75 |
| 5,580,640 | 12/1996 | Kraft et al. | 428/195 |
| 5,595,404 | 1/1997 | Skees | 283/116 |
| 5,635,279 | 6/1997 | Ma et al. | 428/174 |
| 5,695,589 | 12/1997 | German et al. | 156/250 |

FOREIGN PATENT DOCUMENTS

| | | |
|---|---|---|
| 583682 | 8/1987 | Australia . |
| 0 047 182 | 3/1982 | European Pat. Off. . |
| 2 226 297 | 6/1990 | United Kingdom . |

*Primary Examiner*—Janyce Bell
*Attorney, Agent, or Firm*—Nixon & Vanderhye P.C.

[57] ABSTRACT

A combined business form/identification card includes a sheet of cellulosic stock material having a barrier coating on a first portion of the sheet with an overlay of laser-printable varnish on the barrier coat. Lines of weakness are provided in the sheet in the area of the barrier coat and varnish to produce an identification card detachable from the sheet. A second portion of the sheet has indicia imaged thereon.

24 Claims, 6 Drawing Sheets

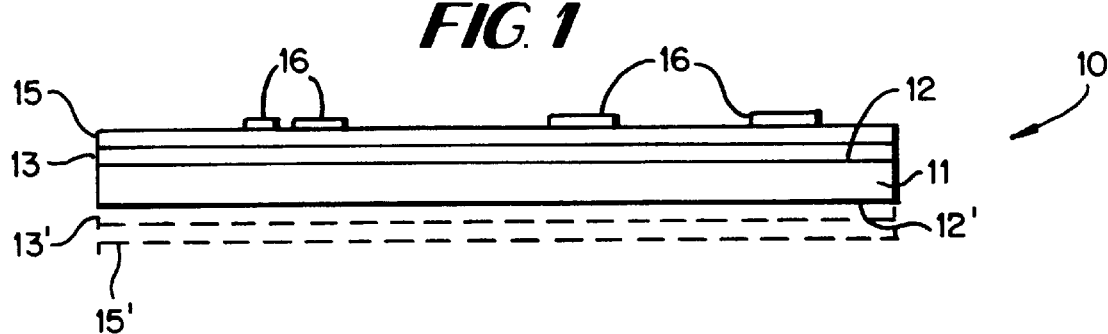
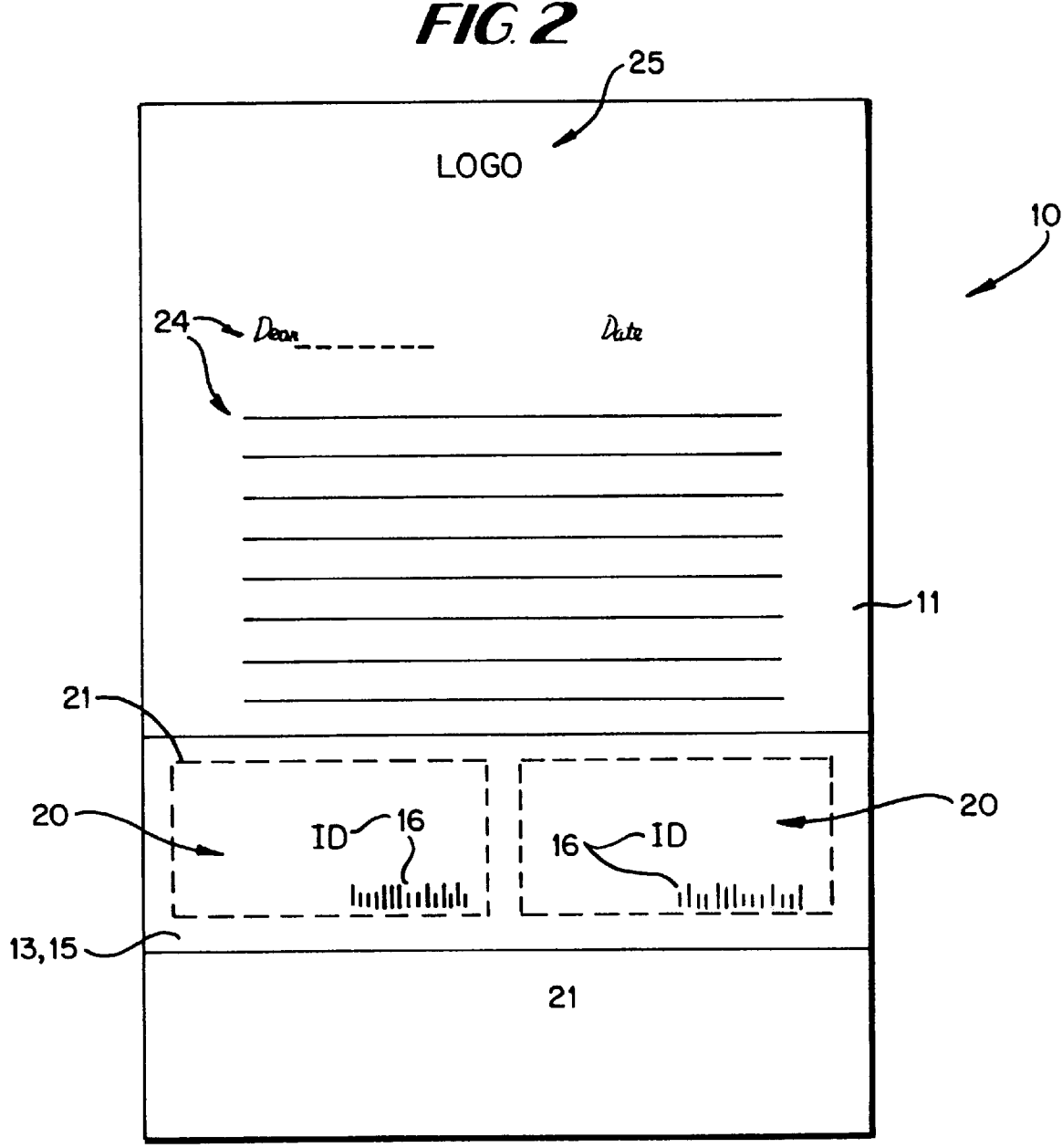

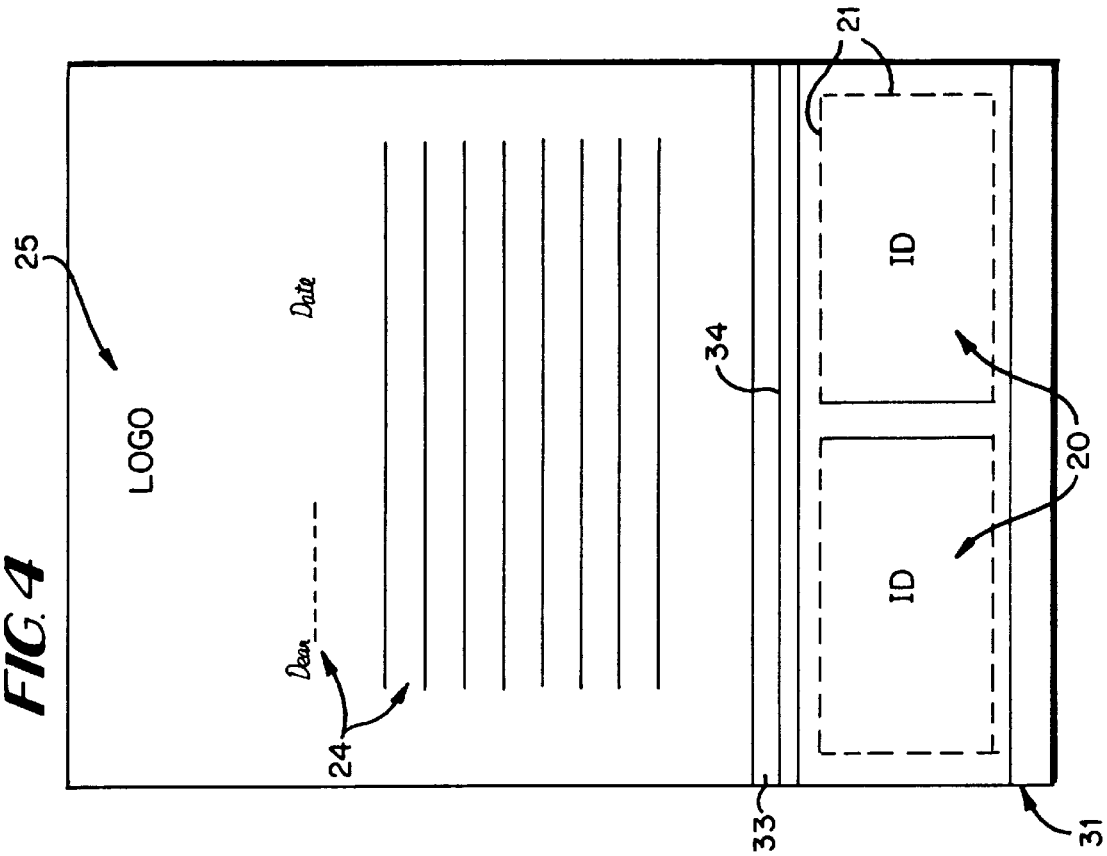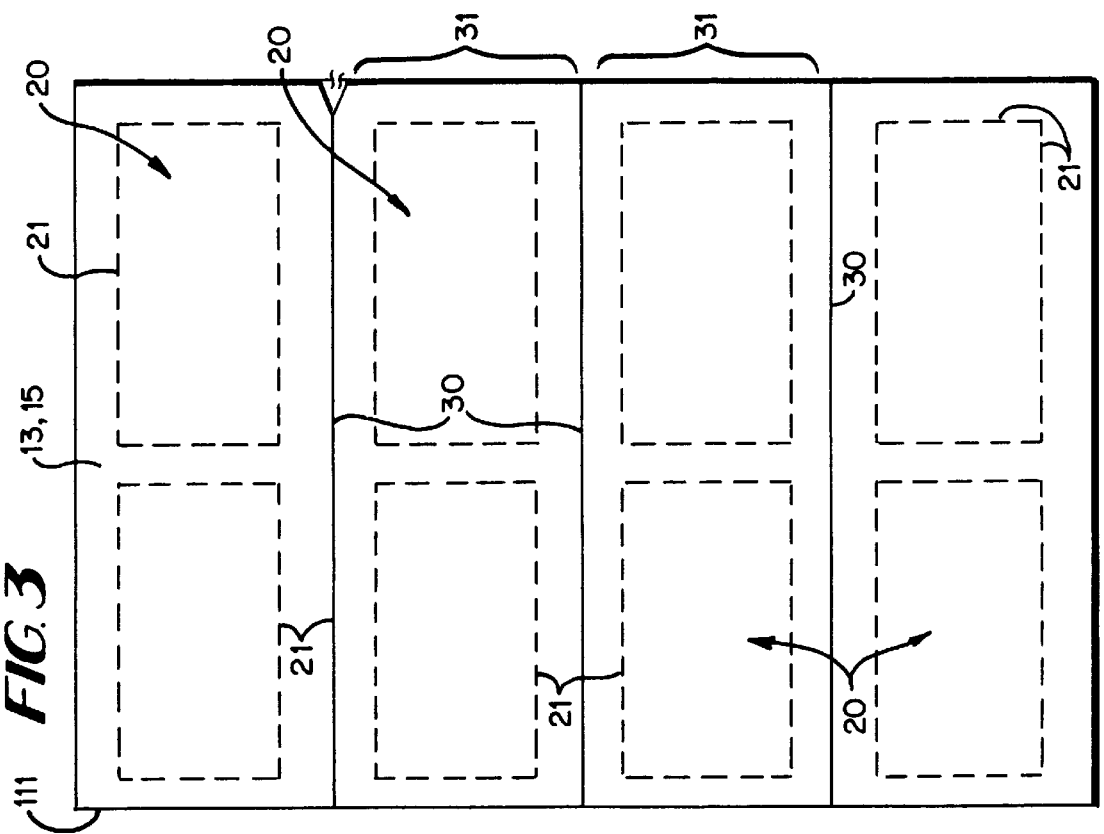

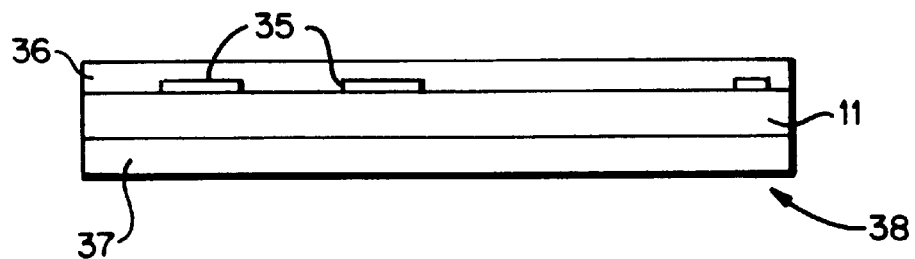
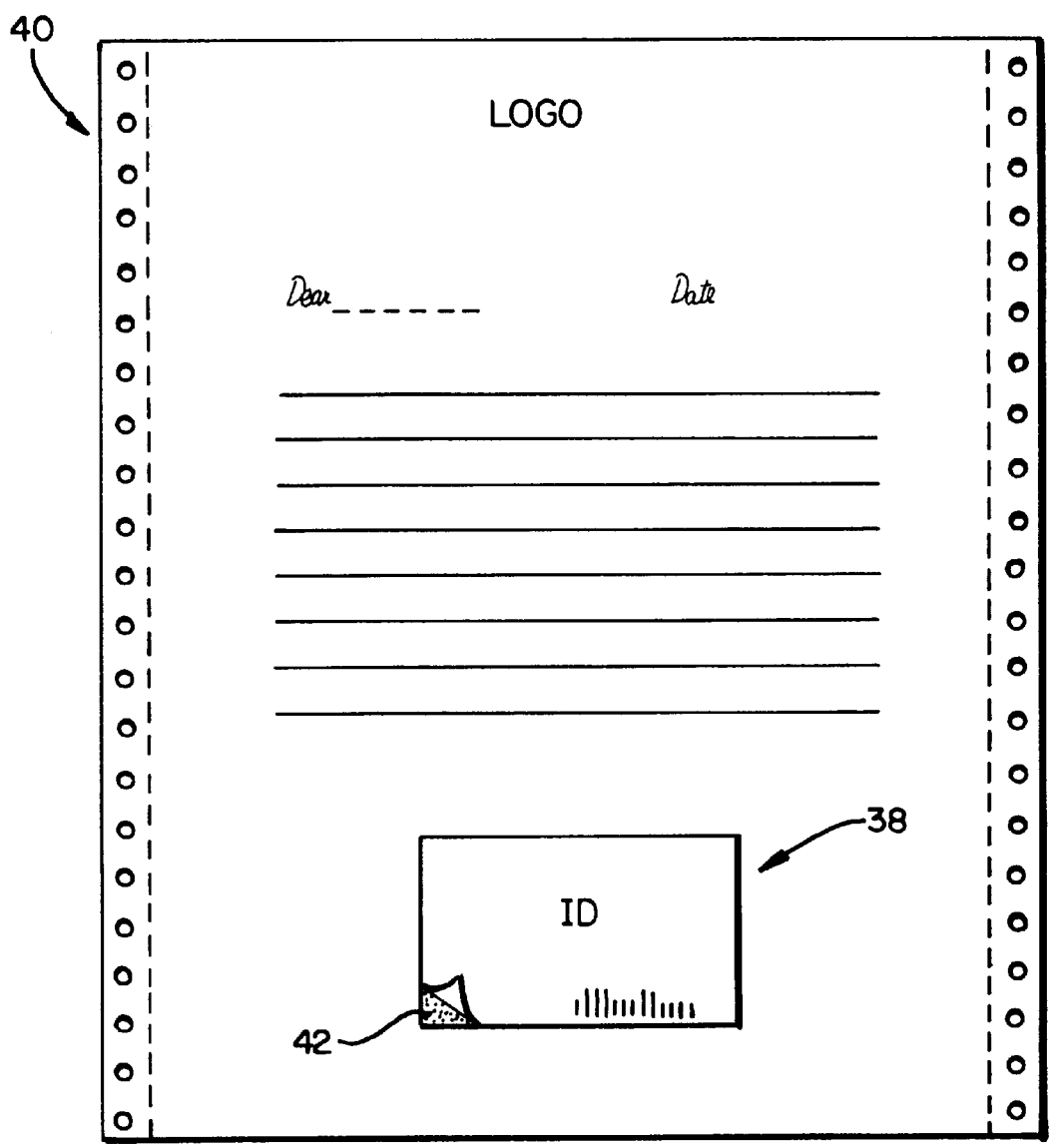

IDENTIFICATION CARD AND METHOD OF MAKING

This is a divisional of application Ser. No. 08/942,589, filed Oct. 2, 1997, now U.S. Pat. No. 5,895,074.

BACKGROUND OF THE INVENTION

Currently, there are a number of identification card (ID) products available in the marketplace. These constructions have included the blow on or tip on of a plastic card onto a sheet which is then passed through a dot matrix printer. When attempting to laser print these cards, the card may peel off the sheet and become jammed in the printer. With today's high speed printers, this type of construction, with the card superimposed on the surface of the sheet creates a stacking problem in the feed tray, in that if a large number of these sheets are stacked in a tray they have a tendency to fall over or create an uneven stack due to the uneven surface area of the cards. In order to avoid the stacking problems, fewer sheets are placed in the feed tray which then requires constant operator involvement to continue placing sheets in the feed tray.

Another solution which has been proposed and in an effort to eliminate the uneven surface area has been to create a multiple part construction in which a window is created in the substrate and the card is inserted into the window. While this does away with the problems associated with stacking, there are increased costs related to the construction due to multiple parts which must be assembled. In addition, due to the increased thickness of the product, the amount of products which can be stacked in a tray for a laser printer is limited, again requiring the operator to maintain a constant interaction with the printer.

A still further prior art embodiment which has been adapted to correct the foregoing problems has been the creation a single sheet which is then laminated with a plastic film to create a card area. In this construction, a sheet is provided, to which an adhesive is applied and then a plastic film is laid over the adhesive. In order to reduce the thickness of the sheet in the area of the lamination, the plastic film or area of the paper having the lamination is calendared or compressed to reduce the overall signature of the sheet. However, this construction also encounters difficulties, such as curling due to exposure of the plastic film to the heat of the laser printer, delamination of the film when the stock is stored too long, and generally conventional plastic films may not accept toner readily from a laser printer. In addition, the cost of such constructions are expensive in that they require not only the paper substrate but also plastic films and laminating equipment. Thus, there is still a need for a cost effective construction which eliminates the foregoing problems.

SUMMARY OF THE INVENTION

The present invention relates to a cost effective business form (e.g. letter or other sheet)/ID card combination. A sheet of paper, ranging from 31 to 52 pound per 1,000 11"×17" sheet bond ream, with 38 pound being preferred, and having a caliper in the range from between 6 mil to 10 mil paper. The paper is selected depending on the requirements of the particular application and is taken and coated on one or both sides with a barrier coating. Over the barrier coating is then applied a laser printable varnish layer which provides a glossy surface for the ID card as well as a receptive surface for the laser printer. The barrier coating is used to reduce the amount of varnish which is needed to create a sufficient thickness for the ID card. The barrier coating may also prevent the varnish from sinking into the paper substrate. In addition, the varnish by itself without the barrier coat may not be sufficiently glossy since the barrier coating serves to hold the varnish on the top. The varnish and barrier coats are available from Rad-Cure of Fairfield, N.J. and marketed under the names Rad-Cure, Rad-Kote® or Raqua-Bond. Other varnishes are available from QureTech of Seabrook, NH.

While a barrier coat is suggested in the above embodiment, it should be understood that where the need for a barrier coat is not present laser printable varnishes can be applied directly to the paper substrates without the necessity of the barrier layer.

The preferable barrier coat is Raqua-bond EG 100 and the preferred U.V. varnish being 107 BLP. Other barrier coatings have been tested such as Northwest Coatings 20951 and Raqua-Bond WBA5524. The barrier coat main constituent is typically polyvinyl alcohol with minor additions of ammonium hydroxide and triethylamine. The U.V. varnish may include acrylate monomers and oligimers with a photo-initiator blend and surfactants. Likewise other UV curable varnishes include 106 BLP and 106 LPLO.

The thickness of the composite (barrier coat and varnish) coating ranges from 0.1 to 0.5 millimeters with about 0.25 being the preferred thickness. Coating weights range from 2.5 to 12.5 gm/sq.m. To produce the ID cards, die cuts are created in the area of the coating to produce one or more detachable cards. If necessary, and depending on the thickness of the coatings, the sheet, either before or after coating can be passed through calendering rolls to compress the thickness of the coating. Alternatively, the sheet can be calendared after the barrier coating is applied and before the U.V. varnish is applied. The coated areas of the sheet then may either be die cut to create the ID cards or alternatively, perfed or microperforated. In either instance, some ties remain to hold the card in position with the sheet stock.

The sheetstock may be strip coated with the barrier coat or the entire sheet can be flood coated and then printed in the area of the coating. Next, the sheet with the barrier coating is overcoated with a varnish which can then be further printed.

A further embodiment of the present invention relates to a cost effective sheet/ID card combination in which the card portion is created separately and then adhered or otherwise affixed to a paper sheet or business form. There are at least two mechanisms by which to accomplish this objective. The first method of creating the card structure is to fully coat a sheet of paper with the barrier coating and varnish as set forth above. This sheet is then slit or cut into strips of the appropriate width to accommodate a die cutting operation. The second method includes a card laminate which is created by laminating two plastic sheets together with a cellulosic substrate therebetween. This can be done in full sheet configurations and then the laminated sheet is split or cut to create individual card units. The cellulosic substrate can contain printing such as logos of the customer, the recipients name and the like. The lamination can be accomplished either through heat and pressure or alternatively, an adhesive is used so as to bind the sheets together. By producing cards in bulk economies of scale can be realized.

In either instance, the card stock or card laminate ("card stock") should ideally be manufactured to be roughly the same thickness as the sheet stock to which it is to be attached. The card stock is attached to the bond sheet by any suitable or known technique, preferably by a strip of adhesive tape and then the area of the adhesive is compressed (e.g. by passing between compressing rolls)so as eliminate as much as possible any ridge in the construction. A further method of attaching the card stock is to apply a line of pressure sensitive adhesive to the paper sheet to which the card stock is to be applied and then lay the card stock over the adhesive and compress the sheet/card stock together in the area of the adhesive. The adhesive tape or strip in each instance should be a permanent adhesive to prevent the premature release of the card stock from the paper substrate.

The card stock and sheet should have the dimensions of a normal sheet, such as 8 ½×11, 11×17 or 8 ½×14 depending on the particular application so that it can be processed through a laser printer.

Variable indicia may be printed on the face of the card, such as an introductory letter to the recipient and the card and letter portion of the product can include matching indicia such as bar code and numeric indicia.

BRIEF DESCRIPTION OF THE DRAWING FIGURES

FIG. 1 is an end view of a combined identification card and business form according to the present invention with certain elements being exaggerated for clarity of illustration;

FIG. 2 is a top view of a form of the present invention with ID cards defined by lines of weakness in the form for ease of removal;

FIG. 3 is a further embodiment of the form hereof;

FIG. 4 is a further embodiment of the form hereof with the form comprised of discrete substrates forming a composite;

FIG. 5 illustrates a form laminated in accordance with the present invention;

FIG. 6 is a top plan view of a form with the ID cards of FIG. 5 applied thereto.

DETAILED DESCRIPTION OF THE DRAWINGS

Figure 7:
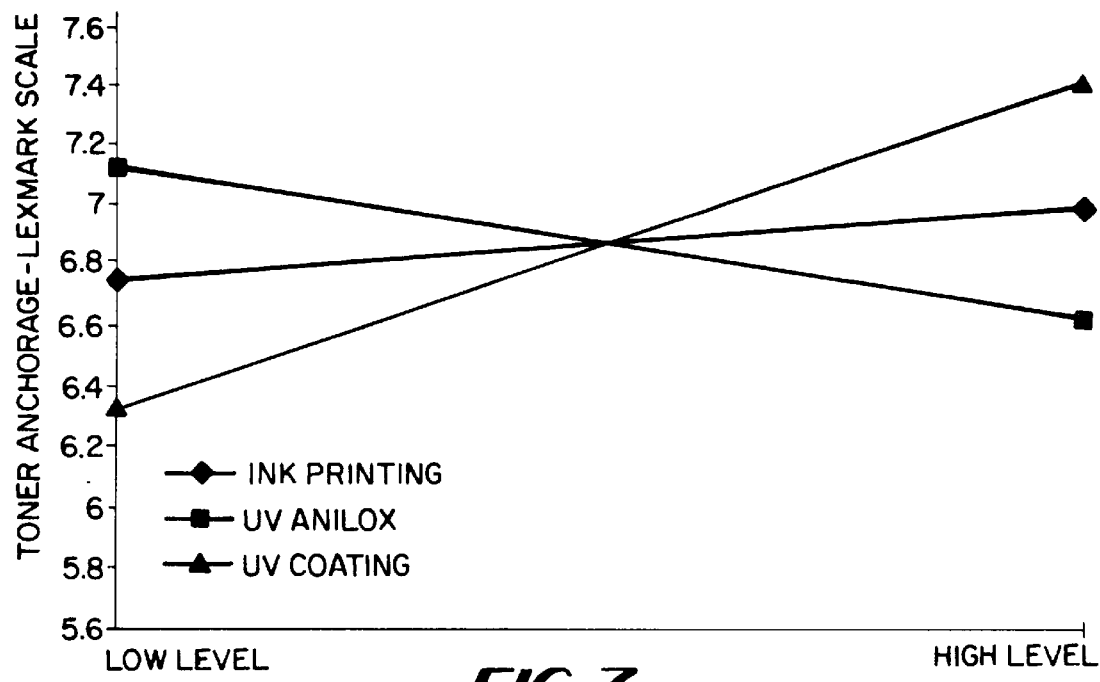
FIGS. 7, 8, 9, 10 and 11 illustrate various graphs plotting various parameters of the forms hereof.

FIG. 1 shows an end view, with the thickness of the elements greatly exaggerated for clarity of illustration, or a combined identification card and business form 10 according to the invention. A substantially rectangular sheet 11 of cellulose stock having a weight of between about 31–52 pounds per ream, and a caliper of between about 6–10 mil, has applied to one face 12 thereof a barrier coating 13 (e.g. of a material such as described above), with a laser printable varnish 15 (e.g. a UV curable varnish such as those described above), which may be pigmented, (or the barrier coat may be pigmented) over the barrier coat 13. The composite coating 13, 15 on the face 12 of the sheet 11 has a thickness that is between about 0.1–5 mm, preferably about 0.25 mm. and a composite coating weight of between about 2.5–12.5 gm/sq.m. Indicia 16 may be laser printed, or otherwise imaged, on the varnish 15. The sheet 11 may be calendered either before or after the coatings 13, 15 have been applied. As shown in dotted line in FIG. 1, another barrier coat 13' and varnish coat 15' may be applied to face 12', so that both faces 12, 12' have ID cards thereon. The barrier coat 13 can be eliminated where penetration of the sheet 11 with the varnish, and/or adhesive of the varnish to the sheet 11, is not a problem.

FIG. 2 shows an embodiment in which the ID cards 20 have been formed in the sheet 11 by lines of weakness 21. One or more (in FIG. 2 two being shown) cards 20 may be formed in the sheet 11. The lines of weakness 21 may be die cuts, perf lines, or microperfs. As seen in FIG. 2, in this embodiment the coats 13, 15 cover less than half of the sheet 11, e. g. about 25% in the embodiment illustrated, and the rest of the sheet 11 comprises a business form, such as a letter, with indicia 24, 25 thereon.

FIG. 3 shows a cellulose sheet 111 that has been flood coated, or otherwise completely covered with barrier coat 13 and varnish 15, with a plurality of ID cards 20 formed by lines of weakness 21 therein. The sheet 111 is then formed into cards 20 for application to another sheet, such as by slitting along lines 30 to form strips 31.

FIG. 4 shows a strip 31 being attached to a business form 32. This attachment may be by any conventional technique, such as overlapping the strip 31 and form 32 and adhesively securing the overlapped portions together, by a splicing material, by mechanically deforming overlapping portions so that they interlock, etc. The preferred way—see in FIG. 4—is to place a strip of (preferably clear) pressure sensitive adhesive tape 33 over the interface 34 between the in-line edges of the form 32 and strip 31 (which are about the same thickness). The tape may be applied to only one side or both sides of the interface. The composite may then be passed through compression wells, or otherwise acted upon to minimize the ridge formed by the tape 33 or tapes. The tape 33 does not overlap the lines of weakness 21.

FIG. 5 shows an embodiment in which a cellulosic stock sheet 11 has indicia 35 imaged on at least one face thereof, with plastic sheets 36, 37 (which may be pigmented) laminated to both faces of the sheet 11, and attached by adhesive, or by application of heat and/or pressure. The individual cards 38 so formed (they may be cut from a large sheet or web containing numerous cards 38, or the cards 38 may be formed individually) are then connected to a business form 40, such as seen in FIG. 6, wherein a card 38 is attached by adhesive 42 to the form 40 having indicia 43 thereon. The adhesive 42 may be repositional adhesive, or may be permanent pressure sensitive adhesive, which will release from the plastic 37 of the card 38 more readily than from the paper business form 40. A card 20 could be used instead of card 38.

The form/card combination of FIGS. 2, 4, or 5 may be inserted into envelopes or made into mailers, such as in U.S. Pat. Nos. 3,093,296 or 5,595,404, or processed in web form such as in U.S. Pat. Nos. 5,427,416, 5,403,236, and 4,846,501.

Figure 8:
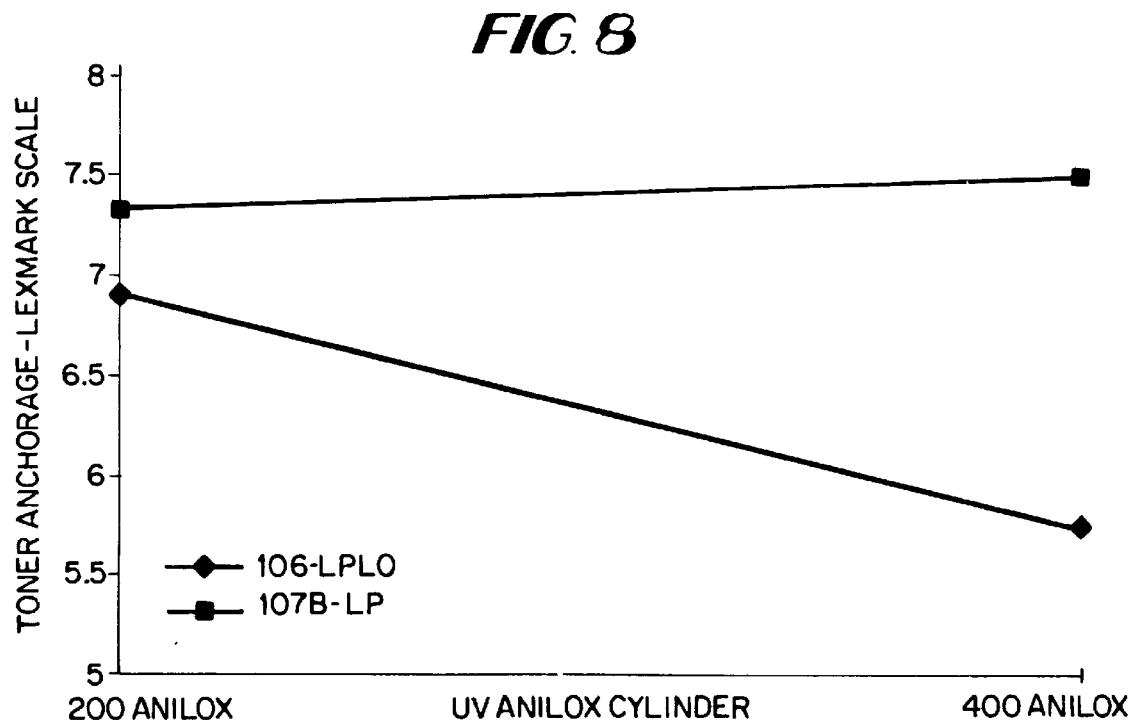
Figure 9:
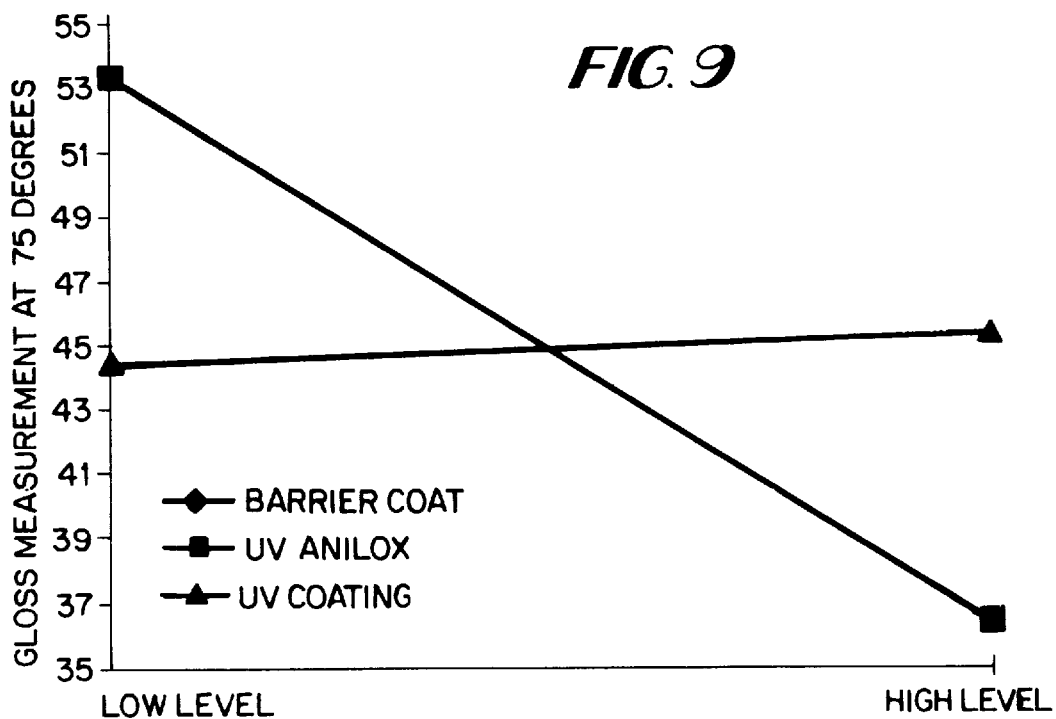
Figure 10:
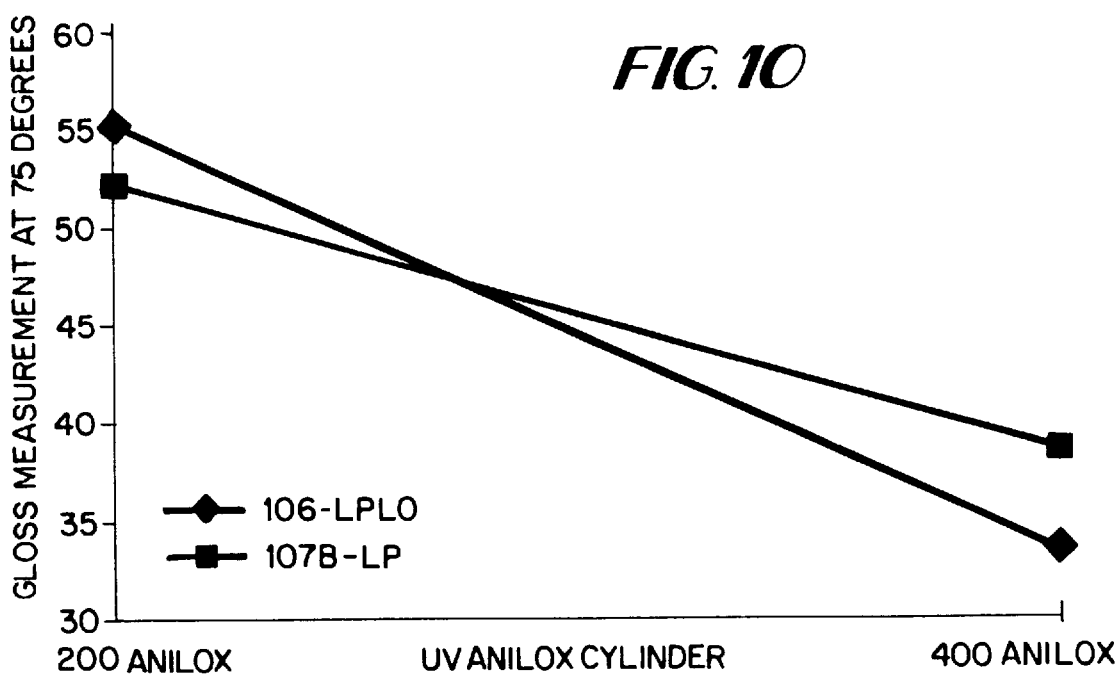
Figure 11:
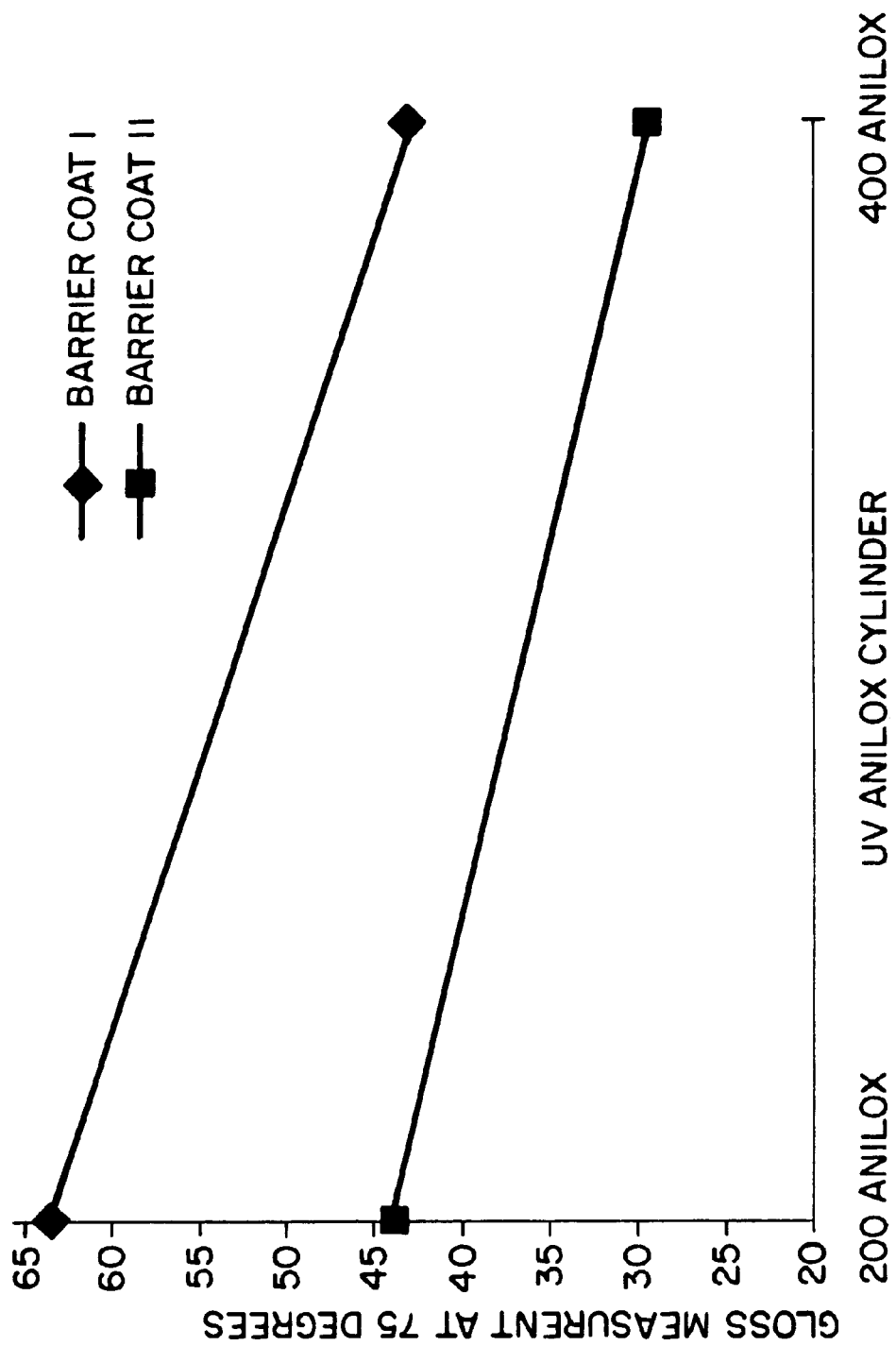

FIGS. 7–11 show various graphs for tests run to show the feasibility of form/card combinations such as illustrated in FIG. 2, which graphs are labeled to show the various parameters being plotted, and are self explanatory.

With respect to the preferred embodiment of FIG. 2 various sample runs were made, from which the data of FIGS. 7–11 was obtained. Rad-Cure's Rad-Kote 107B-LP applied with a 400 line screen anilox gave the best laser-imprintable coating. The glossiest surface was achieved with the top coat 106-LPLO with a 200 anilox; however, this surface had poorer toner anchorage. A heavier coating of 107B-LP would yield a glossier card, but also increase the risk of blocking and odor complaints. Toner anchorage and gloss were similar in blank areas and in a strip of blue (or other color) ink printed under the barrier coating layer.

The barrier coat was very significant in affecting results of gloss, continuity and some toner anchorage tests. There were three differences between barrier coat I and II studied in this experiment, as explained in Table 1.

Four variables were studied. Each variable was run at two levels. This was not quite a full-factorial experiment because the treatment of ink on barrier coat II (AB) was not included.

TABLE 1

Design of Sample Runs

| Factor | Low Level | High Level |
|---|---|---|
| Barrier coating | I | II |
| Ink, Arear AWB25-2925 | Off | On |
| Anilox for UV varnish top coating | 106-LPLO | 107B-LP |

Barrier Coating I: Raqua-bond EG-100 applied with 85 ceramic anilox on the outside of the roll of paper
Barrier Coating II: Raqua-bond WBA5524 applied with 95 chrome anilox on the inside of the roll of paper.

Constants

Mead #38 Moistrite ledge paper, 7.1 mil caliper originally

Paper calendered from 0.8 to 1.1 mil caliper to allow room for coatings.

All coating material is contained within calendered area.

All UV coating run at 150 fpm press speed.

The process and operating conditions for the sample runs were:

Step 1) Calendered both sides of web on Midax® printing system (Moore USA, Lake Forest, Ill.) at 1100 psi both heads over 2 ⅝" width. Pressure provides compression for better holdout, better gloss, and less chance for blocking and provides room for the coatings if necessary. Reduced caliper by 0.8–1.1 mils from 7.1 mils to 6.0–6.3 mils.

Step 2) Coat ink and both barrier coats in one pass on press.

a) On the "printing side out" of the web, print Arcar AWB25-2925 blue ink (phase 25—wax free) with a 250 Harper anilox at 1 3/16" width.

b) Over ink, coat EG-100 barrier coat material with 85 anilox at 2 ⅜" width.

c) Flip web over.

d) Back side, WBA5524 barrier with 95 chrome anilox at same 2 ⅜" width.

Only 105 fpm was achieved because of the thickness of EG-100. This coating also left a heavy ridge on the edge of the coating which picked off onto idler rolls in the press. Press ovens set at 240° F. The viscosity of EG-100 should be reduced so that it can be applied with a clean edge.

Step 3) UV varnish coating on front side (106-LPLO & 107B-LP with 200 and 400 anilox). Press speed 150–155 fpm with a single row of 600 W/in Fusion UV-H bulbs.

Step 4) varnish coating on back side, same four combinations and press conditions.

Responses evaluated in this experiment include toner anchorage, gloss, blocking, coating continuity, and pack lean. Average results are shown in Table 2 on the next page.

TABLE 2

QUALITY TESTING RESULTS AND RESPONSES

| YATES | Blocking Ambient | Visual Appearance | SEM Continuity | Toner Anchor Tape test | Toner Anchor Lexmark test | Pack Lean | Coating Caliper | Gloss |
|---|---|---|---|---|---|---|---|---|
| (1) | some | glossy | OK | 4 | 6.83 | 0.34 | 7.0 | 65.3 |
| A | slight | mottled | voids | 5 | 6.5 | | | 45.4 |
| B | some | glossy | OK | 3 | 7 | | 7.0 | 65.2 |
| C | slight | glossy | thin | 3.5 | 5.67 | 1.3 | 6.8 | 39.3 |
| AC | none | mottled | voids | 4.5 | 7 | | | 28.2 |
| BC | slight | glossy | thin | 3 | 5.83 | | 7.0 | 39.8 |
| D | slight | glossy | OK | 1 | 7.17 | 0.21 | 6.8 | 61.9 |
| AD | slight | mottled | voids | 3 | 7.5 | | | 42.4 |
| BD | slight | glossy | OK | 1 | 7.5 | | 6.9 | 63.2 |
| CD | slight | glossy | thin | 1 | 7.33 | 0.67 | 6.8 | 46.7 |
| ACD | none | mottled | voids | 2 | 7.5 | | | 31.0 |
| BCD | slight | glossy | thin | 1 | 7.67 | | 6.9 | 47.7 |

PRESS TEST CONDITIONS

| YATES | Anilox for Barrier | Blue Ink | Anilox for UV Varnish | UV Varnish |
|---|---|---|---|---|
| (1) | I | off | 200 | 106LPLO |
| A | II | off | 200 | 106LPLO |
| B | I | on | 200 | 106LPLO |
| C | I | off | 400 | 106LPLO |
| AC | II | off | 400 | 106LPLO |
| BC | I | on | 400 | 106LPLO |
| D | I | off | 200 | 107BLP |
| AD | II | off | 200 | 107BLP |
| BD | I | on | 200 | 107BLP |
| CD | I | off | 400 | 107BLP |
| ACD | II | off | 400 | 107BLP |
| BCD | I | on | 400 | 107BLP |

CONSTANTS
Mead 38# Moistrite ledger paper, 7.1 mil originally
Paper calendered from 0.8 to 1.1 mil caliper to allow room for coatings.
All coating is contained with calendered area.
All UV coating run at 150 fpm press speed.
Barrier coating I is Raqua-bond EG-100 applied with 85 cermaic anilox
Barrier coating II is Raqua-bond WBA5524 applied with 95 chrome anilox Toner Anchorage This is the primary characteristic/requirement of the card. Anchorage was measured both on the Lexmark scale and by the tape test. 107B-LP easily outperformed 106-LPLO with an average Lexmark rating of 7.4 vs. 6.3 out of 8. It was the most significant variable. The next most significant treatment is the interaction between the UV coating and anilox (coat weight). 107B-LP showed slightly better anchorage at he low coat weight, but 106-LPLO got even worse at the low coat weight. Plot points and F-ratios are given below; graphs depicting these results are on the "Toner Charts" page. Although all samples met the minimum Lexmark value of 5, only 107B-LP samples passed the tape test. 107B-LP samples had no or little toner pick-off on the tape (1–2 rating); whereas, 106-LPLO samples showed moderate to heavy pick-off on the tape (3–5 rating).

| Low Level | High Level | F-Ratio |
|---|---|---|
| 106-LPLO = 6.3 | 107B-LP = 7.4 | 113 |
| UV Coating/Anilox Interaction | | 42 |
| 200 anilox = 7.1 | 400 anilox = 6.6 | 24 |
| No ink = 6.8 | Ink = 7.0 | 6 |

Gloss

Three readings of gloss were averaged for each sample using a Statistical Novogloss glossmeter at 75° beam angle. Both UV coatings were similar in this test. The anilox cylinder and barrier coating were the two most significant variables. Also two interactions were significant. The recommended combination of 107B-LP/400 anilox had a 47 reading which is semi-glossy. The maximum reading of 65 was with 106-LPLO and the 200 anilox. Average effects and F-ratios are tabulated below. Effect and interaction graphs are on the "Gloss Charts" page. There is no minimum specification yet.

| Low Level | High Level | F-Ratio |
|---|---|---|
| 200 anilox = 54 | 400 anilox = 36 | 864 |
| Barrier I = 53 | Barrier II = 37 | 778 |
| UV Coating/Anilox Interaction | | 49 |
| Barrier Coat/UV Anilox Interaction | | 28 |
| 106-LPLO = 45 | 107B-LP = 46 | 3 |

Blocking

Blocking was tested at ambient conditions under 2.2 psi of weight. This would be the approximate weight of forms in the printer tray. In most cases there was a slight amount of sticking, but the sheets came apart cleanly with a gentle pull. No picking of the coating was seen. The least amount of blocking was seen on the back side coating because of the mottled surface and poor hold-out, but this would not be representative of our final product. Blocking can best be avoided, as well as any odor, by minimizing the coat weight of UV varnish.

SEM Continuity/Visual Appearance 100X magnification of the surface by SEM reveals many details about the coating continuity and smoothness. A huge difference was seen between coverage front to back over barrier coat I and II. On the front, there was only an occasional small void; whereas, the back side showed large gaps in the coating between exposed paper fibers. The heavier coat weight put down with the 200 anilox was noticeable, but not quite as obvious. Continuity was comparable between both UV coatings and between printed and non-printed areas.

Pack Lean/Caliper/Curl

Figures for pack lean reported in Table 2 are an extrapolated estimate of offset in a full printer tray—24" high stack, approximately 3300 sheets. The maximum amount would be 1.3 inches, more than could be tolerated by the customer's printers. The paper was calendered sufficiently to allow room for all the coatings, which can be confirmed by a caliper in the coated areas of 6.8–7.0 mils compared to the paper's original 7.1 mils thickness. In fact, much of the lean is caused by curl from drying the heavy aqueous barrier coat on the back side.

Conclusions

UV top coating: 107B-LP is a better choice for its superior toner anchorage. For both gloss and anchorage tests, it gave a more consistent result at high and low coat weights. This will give us a more robust product. It also cures at a slightly faster line speed on press.

UV anilox roll: A 200 line anilox (8.7 BCM volume) applies a heavier coating thickness than a 400 line (4.0 BCM volume) anilox—which was the most significant factor in achieving high gloss. There are four benefits, however, to using the smaller 400 anilox—lower odor, less blocking, reduced raw material costs, and slightly higher toner adhesion with the 107B-LP coating.

Ink: Printing the ink under the barrier coat has eliminated the problem of poor toner anchorage in the printed area. In this experiment it did not have a significant effect on any result.

Barrier coat: Although barrier coat I gave good gloss, continuity and toner anchorage results, the EG-100 liquid was too thick and its viscosity should be reduced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of producing a combined identification card and business form using a substantially rectangular sheet of cellulose stock having a weight of between about 31–52 pounds per 11"×17" ream, and a caliper of between about 6–10 ml, comprising the steps of:
    (a) applying a barrier coat to a portion of the sheet at least as large as an identification card;
    (b) applying a laser printable varnish over the barrier coat; and
    (c) acting on the sheet to provide lines of weakness in the sheet at the area of the barrier coat and varnish to produce an identification card, the lines of weakness allowing detachment of the card from the rest of the sheet.

2. A method as recited in claim 1 wherein step (a) is practiced by applying the barrier coat and varnish to only a first portion of the sheet having an area of less than 50% of the area of the sheet.

3. A method as recited in claim 2 wherein the barrier coat and laser-printable varnish are applied in a strip having a width of about 3–5 inches, and wherein the sheet has dimensions of about 8.5×11, 8.5×14, or is A4 size.

4. A method as recited in claim 2 wherein the steps of applying the barrier coat and laser-printable varnish provide a composite coating on one face of the sheet that is between 0.1–0.5 mm thick.

5. A method as recited in claim 4 wherein the steps of applying the barrier coat and laser-printable varnish provide a composite coating weight of between about 2.5–12.5 gm/sq.m.

6. A method as recited in claim 5 comprising the further step of (d) imaging with indicia a second portion of the sheet distinct from the first portion, and comprising the further step of laser printing indicia on the laser printable varnish.

7. A method as recited in claim 6 comprising the further step of calendering the sheet before or after steps (b) and (c).

8. A method as recited in claim 1 wherein the barrier coat and laser-printable varnish are applied over substantially an entire first face of the sheet.

9. A method as recited in claim 1 wherein the barrier coat and laser-printable varnish are applied on both first and second faces of the sheet.

10. A method as recited in claim 1 wherein the barrier coat applied in step (a) includes polyvinyl alcohol as a major constituent.

11. A method as recited in claim 1 wherein the laser-printable varnish applied in step (b) includes a UV curable varnish as the varnish.

12. A method as recited in claim 1 wherein step (b) is practiced using a pigmented varnish, having a color other than white, black, brown, or tan, to provide a colored identification card.

13. A method of producing a combined identification card and business form using a substantially rectangular sheet of cellulose stock having a weight of between about 31–52 pounds per ream, and a caliper of between about 6–10 mil, comprising the steps of:

(a) applying a laser printable varnish on the sheet; and (b) acting on the sheet to provide lines of weakness in the sheet at the area of the varnish to produce an identification card, the lines of weakness allowing detachment of the card from the rest of the sheet.

14. A method as recited in claim 13 wherein the step of applying a laser-printable varnish includes applying the varnish to only a first portion of the sheet having an area of less than 50% of the area of the sheet.

15. A method as recited in claim 14 wherein the step of applying a laser-printable varnish includes applying the varnish in a strip having a width of about 3–5 inches, and wherein the sheet has dimensions of about 8.5×11, 8.5×14, or is A4 size.

16. A method as recited in claim 13 wherein the step of applying a laser-printable varnish includes applying a coating on one face of the sheet that is between about 0.1–0.5 mm thick.

17. A method as recited in claim 13 wherein step (a) is practiced to provide a composite coating weight of between about 2.5–12.5 gm/sq.m.

18. A method as recited in claim 13 comprising the further step of imaging with indicia a second portion of the sheet distinct from the first portion.

19. A method as recited in claim 13 comprising the further step of laser printing indicia on the laser printable varnish.

20. A method as recited in claim 13 wherein the step of applying a laser-printable varnish includes applying the varnish over substantially an entire first face of the sheet.

21. A method as recited in claim 13 wherein the step of applying a laser-printable varnish includes applying the varnish on both first and second faces of the sheet.

22. A method as recited in claim 13 wherein the step of applying a laser-printable varnish includes using UV curable varnish as the varnish.

23. A method as recited in claim 13 wherein step (a) is practiced using a pigmented varnish, having a color other than white, black, brown, or tan, to provide a colored identification card.

24. A method as recited in claim 13 wherein step (b) is practiced by die cutting or microperfing.

\* \* \* \* \*